J. SCHAUB.
APPARATUS FOR CONSUMING FUEL.
APPLICATION FILED MAY 19, 1917.
1,275,608.
Patented Aug. 13, 1918.
2 SHEETS—SHEET 1.
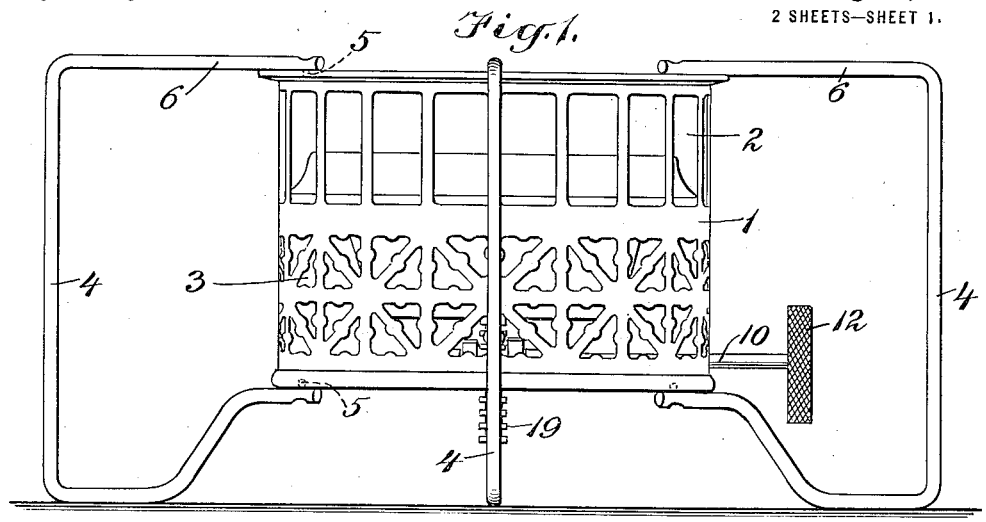
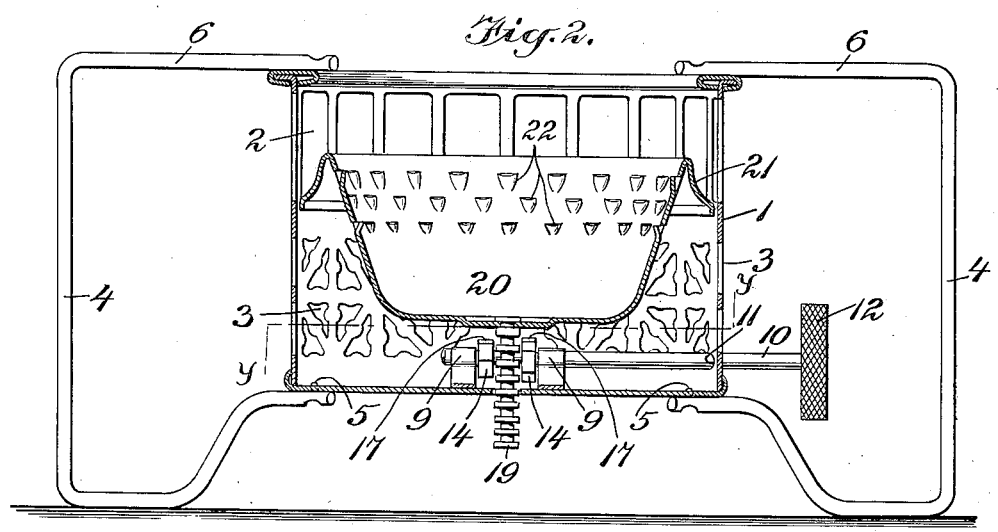
Jacob Schaub
Inventor
By his Attorney
Henry M. Bingham

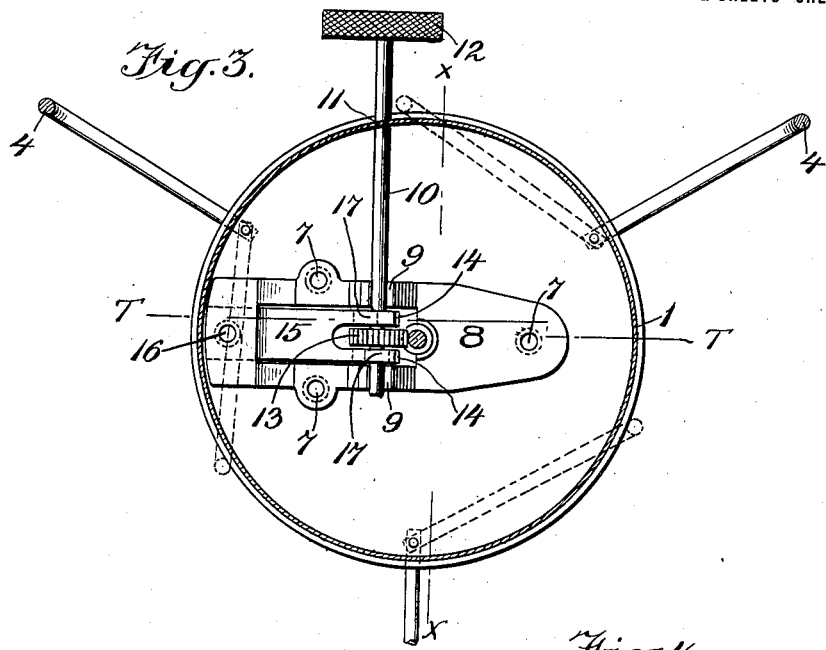
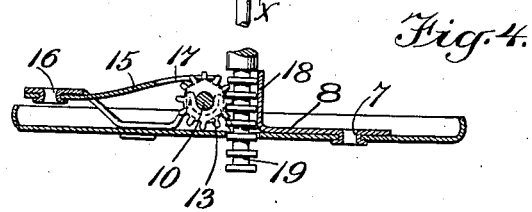
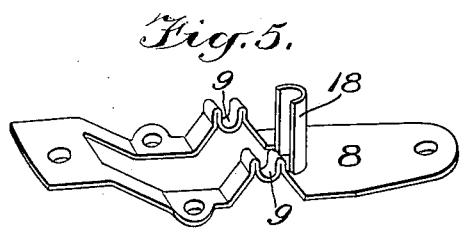
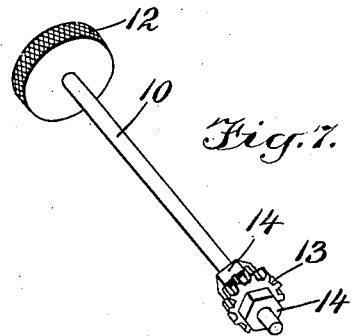

UNITED STATES PATENT OFFICE.

JACOB SCHAUB, OF NEWARK, NEW JERSEY, ASSIGNOR TO AMERICAN LINSEED COMPANY, A CORPORATION OF NEW JERSEY.

APPARATUS FOR CONSUMING FUEL.

1,275,608.  Specification of Letters Patent.  Patented Aug. 13, 1918.

Application filed May 19, 1917. Serial No. 169,632.

*To all whom it may concern:*

Be it known that I, JACOB SCHAUB, a citizen of the United States, and a resident of Newark, in the county of Essex and State of New Jersey, have invented certain new and useful Improvements in Apparatus for Consuming Fuel, of which the following is a specification.

The objects of my invention are to produce a burner which will be simple in construction, easily and accurately regulated, by which high temperatures may be generated, by which the rapidity with which the fuel is consumed may be regulated, and in which the fuel will be completely and economically consumed. These and the other objects of my invention will be more fully set forth in the following specification and claims.

In the accompanying drawings Figure 1 is an elevation of my invention as applied to a small portable stove or heater. Fig. 2 is a section on the line X—X of Fig. 3. Fig. 3 is a sectional view on the line Y—Y of Fig. 2. Fig. 4 is a sectional view on the line T—T of Fig. 3. Fig. 5 is a detailed view of the bracket secured to the bottom of the stove. Fig. 6 is a detailed view of the spring which restrains the gear wheel against rotation. Fig. 7 is a detailed view of the gear and shaft upon which it is mounted.

Similar numerals refer to the same parts throughout the drawings.

My invention as shown in the accompanying drawings is applied to a stove or heater having a cylindrical body 1, of sheet metal, provided with ports 2 and 3 in the side wall thereof. It is supported on legs 4, which are secured to the body 1 by the pins 5, so that the legs may be folded in against the body as shown in the dotted lines in Fig. 3. The upper part of the legs 6 forms a support for a dish or other utensil which it is desired to heat, and maintain such dish or utensil slightly above the top of the cylindrical body of the stove. Mounted on the base by rivets 7 is a bracket 8 provided with bearings 9 in which is mounted a shaft 10, which extends out through the wall of the body 1, and has a bearing 11 therein. On the outer end of the shaft 10 is mounted a milled disk 12. On the shaft 10 between the bearings 9, is mounted a gear wheel 13, and on each side of the gear wheel are mounted hexagonal metal blocks 14, which are secured against rotation on the shaft 10 as is also the gear wheel 13. A forked spring 15 is secured to the bracket 8 by a rivet 16 so that the forked ends 17 will respectively bear against the blocks 14 and tend to restrain the rotation of the shaft 10, and retain the shaft in its bearing 9. The bracket 8 is also provided with an upstanding guide 18 adapted to receive a rack rod 19 with which the gear wheel 13 coöperates. Supported on the rack rod 19 is a fuel basket 20, having an outwardly and downwardly turned flange 21 of slightly less diameter than the internal diameter of the body 1. The side wall of the fuel basket 20 is provided with series of ports 22, the ports in the upper series being of greater capacity than those of the series beneath. These ports 22 are formed by cutting and forcing inward the metal of the side wall of the basket 20, as shown in Fig. 2, the lower ports being designed to supply oxygen to maintain a sufficient combustion immediately around the fuel, to cause the generation of the desired amount of gas from the fuel, the combustion of which is completed by the air admitted through the upper ports and over the top of the basket.

In practice I have found that better regulation and more perfect combustion can be obtained by forming the ports in the basket with lips as shown in Fig. 2, as these lips direct the air currents upward and cause a better and more even distribution of the air to all parts of the combustible zone within the basket 20 and prevent undue combustion in the vicinity of the fuel and undue generation of combustible gases from the fuel, at the same time supplying oxygen to complete the combustion of the gases generated.

The operation of my apparatus is as follows:—

Fuel, preferably solidified alcohol in the form of a solid jelly, which does not fuse while burning, is placed in the fuel basket 20, and ignited. The dish or other object to which the heat is to be applied is placed on the burner and rests upon the upper portions 6 of the legs 4. A limited quantity of air is drawn through the ports 3 and 22 into the basket 20. This air is directed upward by the lips of the ports but then passes downward and supports the initial combustion which causes combustible gases to be thrown off from the fuel. Additional air to complete combustion is admitted through ports 2. The rapidity of the combustion may be regulated by lowering or raising the basket 20 by means of the rotation of the gear wheel 13 which coöperates with the rack rod 19. The tension of the spring 15 on the metal blocks 14 is sufficient to maintain the basket 20 in any desired position. The supporting legs 4 may be swung in toward the body 1 as shown in the dotted lines in Fig. 3, so that the stove may be packed in a small space and yet, when the legs are swung outward they form a firm support, so that the stove may not be readily upset when in operation. When the basket 20 has been raised to its highest elevation, the ports 2 will be nearly closed and the fuel burns slowly and comparatively only a small amount of heat is generated. On the other hand, when the basket 20 is maintained in the position shown in Fig. 2 the ports 2 are open to the admission of air, and gas is thrown off freely from the fuel and completely consumed in close proximity to the dish or other utensil which is to be heated.

Having described my invention, I claim:

1. Apparatus for consuming fuel comprising in combination a casing, air ports in the casing, a fuel basket mounted in said casing, air ports in the fuel basket, and means for longitudinally adjusting the fuel basket in the casing, constituting means for regulating the rate of combustion of the fuel contained in the fuel basket.

2. Apparatus for consuming fuel, comprising in combination a casing, air ports in the casing, a fuel basket mounted in said casing, and air ports in the fuel basket provided with lips adapted to direct the air entering the ports upward and away from the fuel contained in the basket.

3. Apparatus for consuming fuel, comprising in combination a fuel basket, and air ports in the side wall of the basket adapted to direct the air entering the basket through the ports away from the fuel contained in the basket.

4. Apparatus for consuming fuel, comprising in combination a fuel basket, air ports in the side wall of the fuel basket adapted to direct the air entering the basket through the ports away from the fuel contained in the basket, and means for supporting the fuel basket in an elevated position.

Signed at New York city, in the county of New York and State of New York, this 15th day of May, 1917.

JACOB SCHAUB.

Witnesses:
PAUL R. JAMES,
MARGARET A. HECK.